United States Patent [19]
Lim et al.

[11] Patent Number: 5,722,667
[45] Date of Patent: Mar. 3, 1998

[54] SEAL ASSEMBLY FOR USE BETWEEN PLANAR SURFACES HAVING OPPOSED GROOVES TO RECEIVE AND HOLD THE SEAL ASSEMBLY

[75] Inventors: Michael J. Lim, Marlton, N.J.; Charles E. Wohlers, Chadds Ford, Pa.

[73] Assignee: Garlock, Inc., New York, N.Y.

[21] Appl. No.: 320,078

[22] Filed: Oct. 7, 1994

[51] Int. Cl.$^6$ .................................................. F16J 15/10
[52] U.S. Cl. ........................ 277/164; 277/165; 277/167.5; 277/227
[58] Field of Search .................... 251/306; 277/121, 277/165, 227, 228, 205, 193, 199, 167.5, 206 R, 164

[56] References Cited

U.S. PATENT DOCUMENTS

| | | | |
|---|---|---|---|
| 2,377,510 | 6/1945 | Newell | 277/206 |
| 2,859,061 | 11/1958 | Reid | 277/228 |
| 3,479,063 | 11/1969 | Raver | 277/167.5 |
| 3,572,734 | 3/1971 | Holt | 277/205 |
| 3,597,820 | 8/1971 | Schenck | 29/157.1 |
| 4,111,440 | 9/1978 | Young | 277/165 |
| 4,510,966 | 4/1985 | Parsons | 277/167.5 |
| 4,618,154 | 10/1986 | Freudenthal | 277/205 |
| 4,741,541 | 5/1988 | Franken | 277/26 |

*Primary Examiner*—William A. Cuchlinski, Jr.
*Assistant Examiner*—John L. Beres

[57] ABSTRACT

A seal assembly for use between a pair of abutting planar surfaces with opposed grooves which combine to form a seal groove to receive the seal assembly. The seal assembly includes a stiffly flexible body element having portions which surround, protect and compress a pair of more resilient members. The compressed resilient members hold portions of the body element in sealing engagement with faces of the seal groove formed between the abutting planar surfaces.

16 Claims, 2 Drawing Sheets

SEAL ASSEMBLY FOR USE BETWEEN PLANAR SURFACES HAVING OPPOSED GROOVES TO RECEIVE AND HOLD THE SEAL ASSEMBLY

FIELD OF THE INVENTION

The present invention relates to a seal ring assembly intended for use between a pair of abutting planar surfaces. More specifically, the seal ring assembly includes a stiffly flexible member which substantially totally surrounds at least one more resilient member.

Background of the Invention

In certain fluid handling systems, it is necessary or desirable to include fluid sealing means located between a pair of abutting or opposed relatively rotatable planar surfaces. Sealing means of this type are often used in plug or butterfly valves where special difficulties arise when it is necessary to seal corrosive or otherwise aggressive materials. In such situations, a common seal solution has been to use polytetrafluoroethylene (PTFE) or other resins highly resistant to the corrosive materials. Sometimes such seals have been made only of the resin material and in other applications, resins have been used in combination with elastomeric or other more flexible and more resilient materials. Examples of such sealing arrangements are shown in U.S. Pat. Nos. 3,376,014, 3,447,780 and 4,510,966.

While these prior sealing efforts have offered some improvements, all have had shortcomings of one sort or another. For example, when such seals have been made solely of resin material such as PTFE, there has been insufficient resilience and thus difficulty in achieving satisfactory sealing. When seals have added an elastomeric element to get greater resilience and better sealing, resistance to chemical attack has been reduced and overall seal life has been reduced. Furthermore, such elastomeric elements are more apt to wear or erode during frequent relative motion of the planar surfaces. Another difficulty has been that installation of multiple seals can be more awkward as well as lead to injury of one or more components.

SUMMARY OF THE INVENTION

The above recited difficulties have been alleviated or overcome by the present design in which a pair of elastomeric elements are substantially totally surrounded or circumscribed by portions of a stiffly flexible element when the assembly is in its installed position. Preferably the stiffly flexible element is generally E-shaped and the elastomeric elements are positioned between arms of the E. When the assembly is installed in an appropriate groove between planar surfaces, the upper and lower arms of the E close toward the center arm to substantially surround the elastomeric elements.

A primary object of the invention is to provide a seal assembly which provides more effective sealing for longer periods of time.

Another object of the invention is to provide a seal assembly which is relatively easy to install and one with a minimal risk of damage to any seal component during installation.

Yet another object of the invention is to form a combination whereby valves or other mechanical elements combine with the seal assembly of the invention to form a longer lasting and more efficient sealing combination.

BRIEF DESCRIPTION OF THE DRAWINGS

These and other objects, features and advantages of this invention will become more fully understood and clear to those having skill in this art by reference to the following detailed description and claims, and to the accompanying drawings in which:

DETAILED DESCRIPTION OF THE INVENTION

Figure 1:
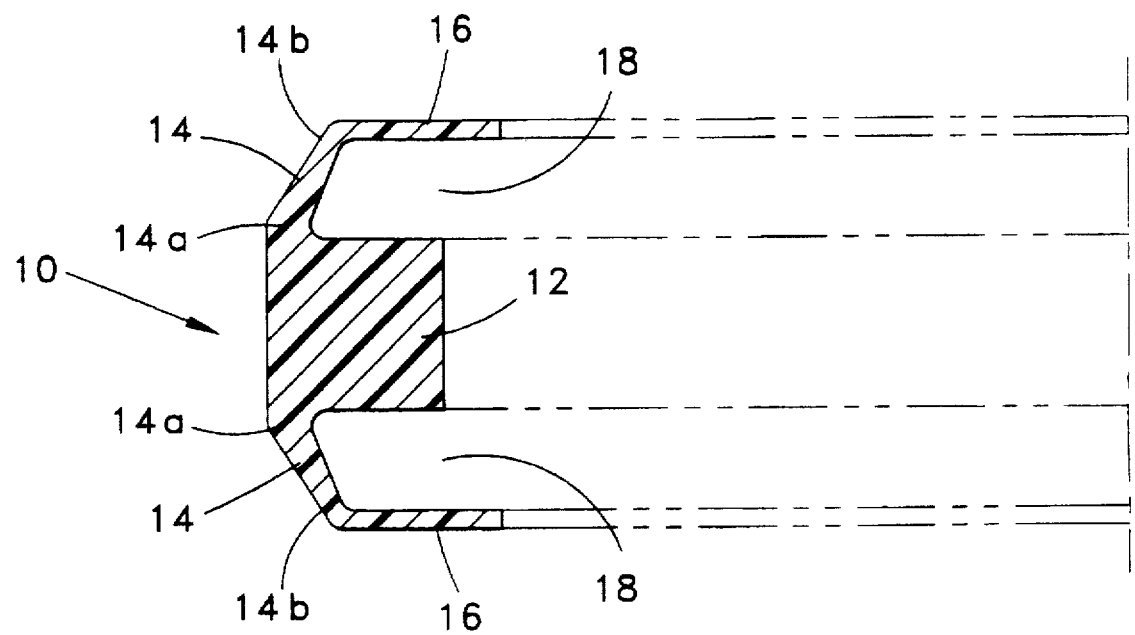
FIG. 1 is an enlarged cross-sectional view of a stiffly flexible element which forms a part of the assembly of the invention.

FIG. 1 shows a stiffly flexible resin element 10 in a preferred as formed shape. Element 10 is a generally E-shaped web with a central arm 12, a pair of legs 14 extending in opposite directions from one end of arm 12 and a pair of end arms 16 extending from remote ends of legs 14 and substantially parallel to central arm 12. It is anticipated that central arm 12 will normally be somewhat heavier and stiffer than legs 14 and end arms 16. Arms 12 and 16 and legs 14 combine to form a pair of axially spaced apart openings 18 which receive a pair of O-rings as described below. Legs 14 preferably comprise portions 14a extending at a substantially right angle from one end of central arm 12 and portions 14b extending in opposite directions to each other and at acute angles relative to arm 12. However, in some instances it may be desired to in effect omit portion 14a and have legs 14 extend directly at acute and opposite angles from one end of central arm 12.

Figure 2:
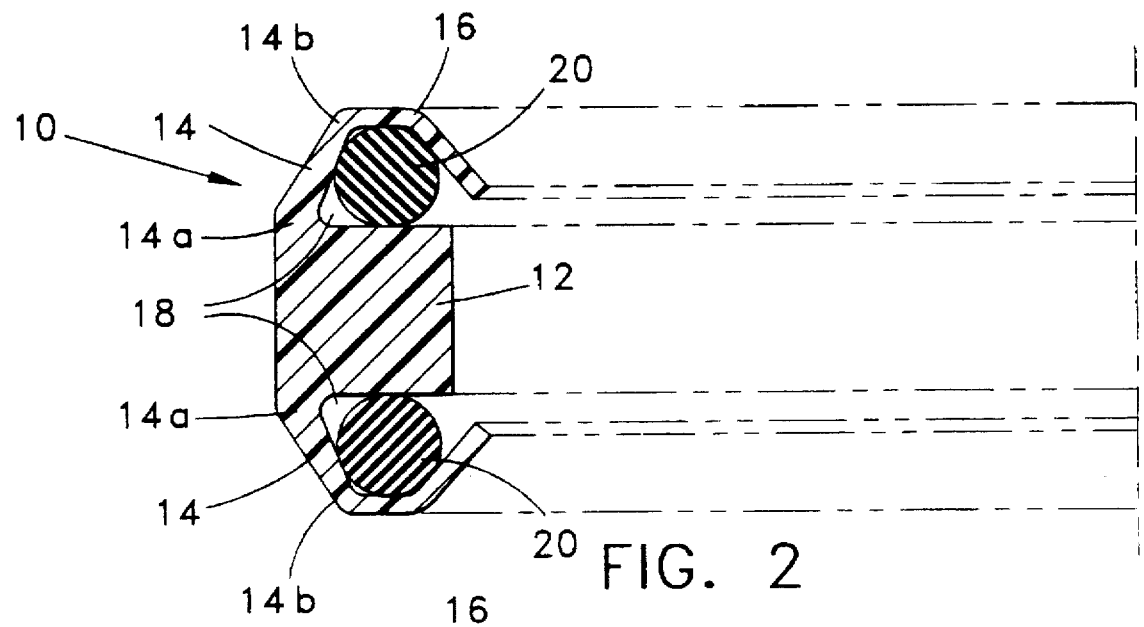
FIG. 2 is an enlarged cross-sectional view showing a complete seal assembly according to the invention.

FIG. 2 shows element 10 mated with a pair of O-rings 20 and end arms 16 reformed or bent in order to retain O-rings 20 in openings 18 to form a complete seal assembly ready for insertion into an appropriate sealing position.

Figure 3:
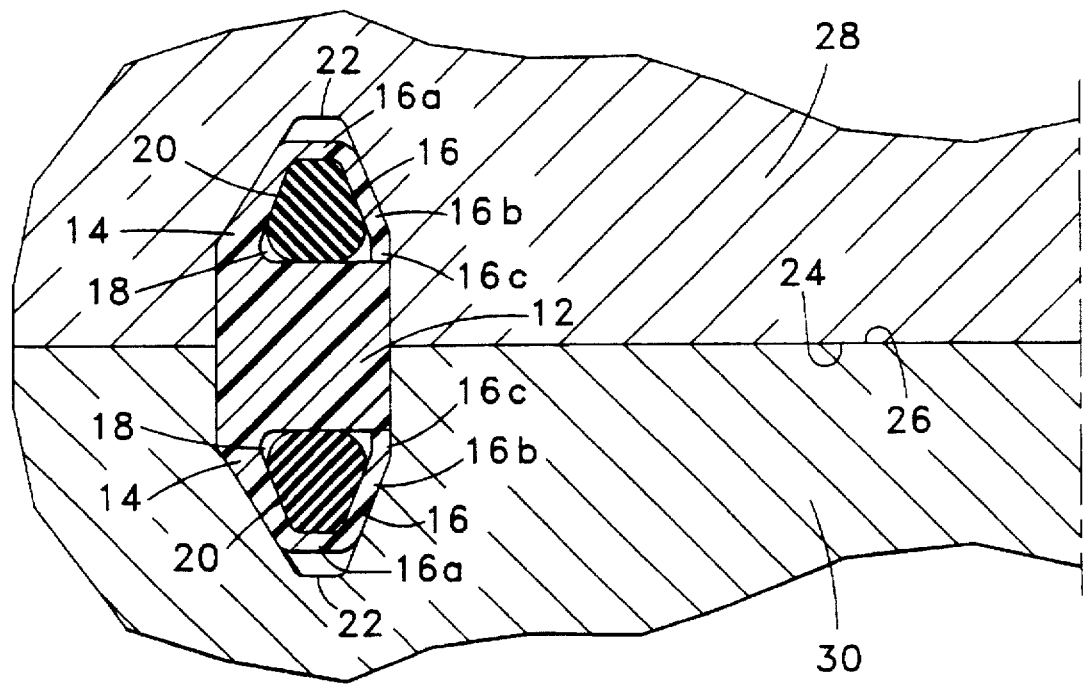
FIG. 3 is an enlarged cross-sectional view of the seal assembly of the invention positioned in a groove formed between a pair of abutting planar surfaces.

Turning now to FIG. 3, there is shown a seal assembly according to FIG. 2 installed in sealing position in a seal groove 22 formed between a pair of abutting planar surfaces 24 and 26. At least one of said surfaces is rotatable about a common axis normal to said surfaces. For example surface 24 may be a part of a butterfly liner 28 and surface 26 may be a part of a rotatable butterfly valve disc 30. When the seal assembly of FIG. 2 is placed in seal groove 22 and planar surfaces 24 and 26 are brought together, arms 16 are reformed to comprise generally radial portions 16a, end portions 16b at acute angles generally complementary to those of leg portions 14b and tip portions 16c substantially perpendicular to and ending adjacent to or preferably in abutting contact with central arm 12.

Preferably both surfaces 24 and 26 are formed of the same material as element 10 so that each component has equal resistance to attack by the fluid materials being sealed. When sealing corrosive or otherwise aggressive fluids, seals and machinery linings such as element 10 and surfaces 24 and 26 are preferably made of a fluorocarbon resin such as polytetrafluoroethylene (PTFE), fluorinated ethylene propylene (FEP) or perfluoroalkoxy (PFA) with PTFE resin being particularly preferred. However, in instances where other factors such as abrasion resistance, cost, etc., are important, surfaces 24 and 26 and element 10 may be of different stiffly flexible material such as ultra high molecular weight polyethylene (UHMWPE) or various urethanes. Since, in a preferred fully assembled sealing position, portions 16c of arms 16 are in contact with arm 12, O-rings 20 may be of any elastomeric material which has sufficient heat resistance for the particular application and sufficient resilience to maintain effective force on arms 16 and legs 14. For example, a 70 or 80 durometer ethylene propylene diene monomer (EPDM) rubber may be used where temperatures do not exceed 300° F. while a similar durometer fluoroelastomer such as Viton (a trademark of the DuPont Co.) may be used for temperatures up to 400° F.

In operation, when the seal assembly shown in FIG. 2 is inserted in an appropriate seal groove, as for example groove 22 of FIG. 3, arms 16 and legs 14 deform and fold to conform to the shape of receiving groove 22 and enclose and compress O-rings 20. In this manner the resilient O-rings apply outward pressure to legs 14 and arms 16 of element 10 to hold those legs and arms in constant sealing contact with the walls of groove 22 regardless of temperature fluctuations or relative motions of the associated mechanical apparatus such as a valve.

The enclosure of O-rings 20 as described above eliminates wear previously caused by frictional drag between such O-rings and the adjacent walls of the disc groove or the walls of the seal ring itself. The overall result is an improved sealing capability since the O-rings are not subjected to mechanical wear or chemical attack and they therefore maintain an appropriate elastomeric or resilient outward force to hold the element 10 in proper sealing engagement with the walls of groove 22 at all times and for a longer overall period.

Figure 4:
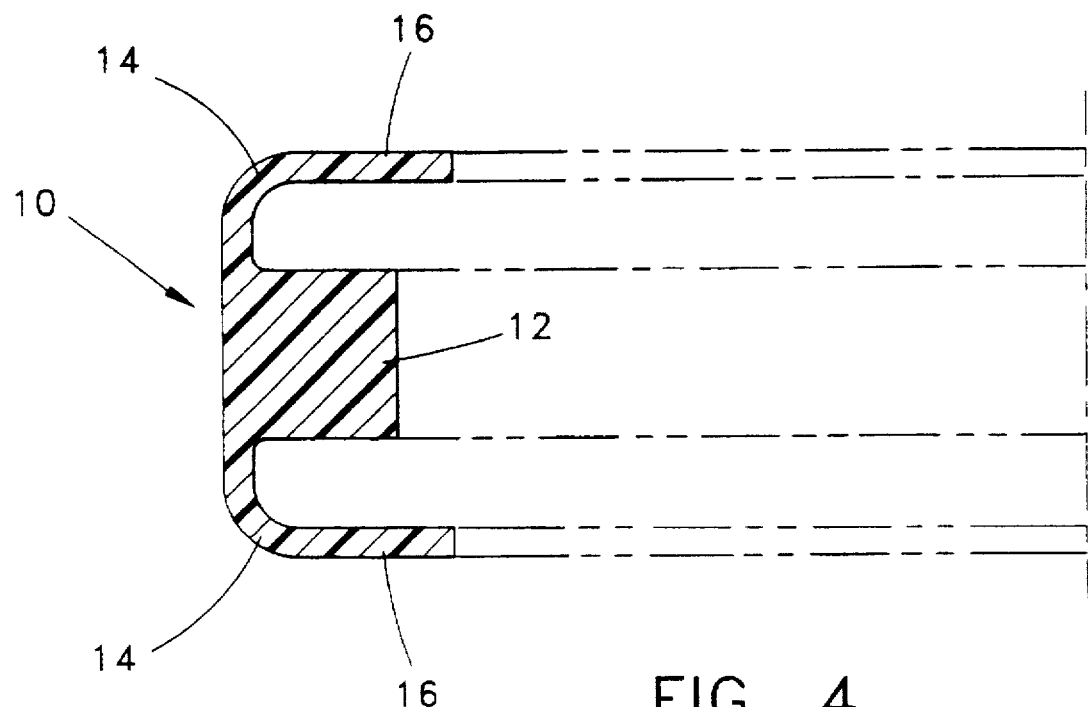
FIG. 4 is an enlarged cross-sectional view of another embodiment of a stiffly flexible element according to the invention.

In FIG. 4, a variation of the FIGS. 1-3 design is shown in which legs 14 are basically a pair of arcs which blend into arms 16. There may be times when such a shape is easier to fabricate and upon installation, legs 14 and 16 will still deform and maintain the desired sealing engagement with the walls of a containing groove such as groove 22 of FIG. 3.

While a preferred embodiment and some variations thereof have been shown and described in detail, other modifications will be readily apparent to those skilled in the art of sealing valves and the like. For example, instead of the body member being formed with a generally E-shaped web of material to form the pair of axially spaced-apart openings, the web as formed may be preformed to define a cross-sectional shape having a pair of spaced-apart, generally circular openings each with a radial slit therein so that the web may be flexed and opened at the slits to allow insertion of the resilient O-ring elements.

Further, while O-rings may be preferred for use as seal rings 20, other shapes such as Quad rings or rectangular rings may be used as long as such seal rings have the necessary resilience. Thus, the preceding specification should be interpreted as exemplary rather than as limiting and the scope of the invention should be regarded as being defined by the following claims.

We claim:

1. A seal assembly comprising:
    a body element formed of stiffly flexible material and having a pair of axially spaced-apart openings and
    a pair of seal rings of resilient material positioned in said pair of spaced-apart openings;
    said body element having integral flexible web portions defining each of said spaced-apart openings such that, upon installation in sealing position in a groove formed between a pair of planar surfaces, said seal rings are substantially surrounded by said body element so that said seal rings cannot be subjected to any rubbing contact.

2. A seal ring assembly according to claim 1 in which the stiffly flexible material of said body element is more resistant to chemical attack than the resilient material of said seal ring.

3. A seal ring assembly according to claim 2 in which the material of said body element is a fluorocarbon resin.

4. A seal ring assembly according to claim 3 in which said fluorocarbon resin is polytetrafluoroethylene.

5. A seal ring assembly according to claim 2 in which said seal rings are O-rings.

6. In combination, apparatus having a pair of abutting planar surfaces at least one of which is rotatable about a common axis normal to said surfaces, each of said surfaces having an annular groove therein coaxial with said common axis, said grooves being aligned with each other to form a seal groove and an annular seal assembly positioned within said seal groove, said seal assembly comprising
    a body element formed of stiffly flexible material and having a pair of axially spaced-apart openings and
    a pair of seal rings of resilient material positioned in said pair of spaced-apart openings;
    said body element having integral flexible web portions defining each of said spaced-apart openings such that said seal rings are substantially surrounded by said body element so that said seal rings cannot be subjected to any rubbing contact and said seal assembly being oriented such that one of said pair of seal rings and its surrounding web portions is positioned at least partially in each of said annular grooves.

7. The combination of claim 6 in which the materials of said planar surfaces and said body element are substantially similar and more resistant to chemical attack than the resilient material of said seal rings.

8. The combination of claim 7 in which the materials of said planar surfaces and said body element are a fluorocarbon resin.

9. The combination of claim 8 in which said fluorocarbon resin is polytetrafluoroethylene.

10. The combination of claim 6 in which said seal rings are O-rings.

11. A seal ring assembly comprising
    a generally E-shaped body element formed of stiffly flexible material, said body element having:
    a central radially extending arm,
    a pair of opposed legs extending generally axially from the radially outer end of said central arm and a pair of end arms extending generally radially inwardly from the ends of said legs remote from said central arm, said arms and legs combining to form a pair of axially spaced-apart openings, and
    a pair of O-rings of resilient elastomeric material positioned in said pair of spaced-apart openings and substantially surrounded by said arms and legs of said body element when said assembly is installed in sealing position in a groove formed between a pair of planar surfaces.

12. A seal ring assembly according to claim 11 in which the stiffly flexible material of said body element is more resistant to chemical attack than the resilient material of said seal rings.

13. A seal ring assembly according to claim 12 in which the material of said body element is a fluorocarbon resin.

14. A seal ring assembly according to claim 13 in which said fluorocarbon resin is polytetrafluoroethylene.

15. A seal ring assembly according to claim 11 in which said seal rings are O-rings.

16. A seal assembly, comprising:

a body member formed of stiffly flexible material and having a cross-section characterized by a central portion and a pair of integrally formed flexible web portions on axially opposite sides of said central portion; and a pair of seal rings of resilient material positioned in abutting relationship with said central portion of said body member on axially opposite sides thereof;

said flexible web portions being formable around part of said seal rings so as to define together with said central portion, a pair of axially spaced apart openings in said body member and said central portion and said pair of flexible web portions substantially surrounding said seal rings when said seal assembly is fully installed so that said seal rings cannot be subjected to any rubbing contact;

said seal assembly adapted for installation in a pair of opposed annular grooves formed between a pair of planar surfaces and when installed in sealing position being oriented such that one of said pair of seal rings and its surrounding web portion is at least partially positioned in each of said annular grooves.

* * * * *